United States Patent [19]

Müller

[11] 3,997,941
[45] Dec. 21, 1976

[54] FILLING MACHINE FOR STUFFING OF PLASTICALLY DEFORMABLE MASSES

[75] Inventor: Johann Müller, Biberach an der Riss, Germany

[73] Assignee: Albert Handtmann, Biberach an der Riss, Germany

[22] Filed: Oct. 15, 1974

[21] Appl. No.: 515,010

[30] Foreign Application Priority Data

Oct. 18, 1973 Germany .......................... 2352229

[52] U.S. Cl. ...................................... 17/35; 17/37
[51] Int. Cl.² ........................................ A22C 11/02
[58] Field of Search ................ 17/35, 37, 33, 36; 222/218; 417/462; 99/450.7

[56] References Cited

UNITED STATES PATENTS

| 3,769,657 | 11/1973 | Muller | 17/35 |
|---|---|---|---|
| 3,883,925 | 5/1975 | Muller | 17/35 |

FOREIGN PATENTS OR APPLICATIONS

| 285,534 | 1/1971 | U.S.S.R. | 17/35 |

Primary Examiner—Louis G. Mancene
Assistant Examiner—James D. Hamilton
Attorney, Agent, or Firm—Ernest G. Montague; Karl F. Ross; Herbert Dubno

[57] ABSTRACT

The invention relates to a filling machine for stuffing of a plastically deformable mass such as baked sausage material using a filling pump which, per a unit angular displacement conveys equal amount of filling masses and is coupled to common drive shaft by two gear trains, at least one of which has an intermittently-driven output member on a periodically variable transmission ratio. The machine includes a first differential gear train with three coupling connections, one each of the latter coupling connections are connected to the first coupling connection of one of the gear trains and the common drive shaft respectively, while the second coupling connections of the two gear trains are couplable to each other.

7 Claims, 3 Drawing Figures

FILLING MACHINE FOR STUFFING OF PLASTICALLY DEFORMABLE MASSES

FIELD OF THE INVENTION

My invention relates to a filling machine for stuffing plastically deformable masses into a tube and producing portions thereof.

BACKGROUND OF THE INVENTION

To discharge several successive portions from a filling machine of the kind mostly used in the preparation of sausages the filling pump must be driven in a pulsating, or stepwise, fashion. It is known to use an oscillating crank-drive therefore which acts on the pump shaft via a free-running drive, the former being secured against any reverse rotation by a ratchet (see DT-OS No. 1,432,513). A second gear train is therefore coupled in parallel with the first gear train inserted between a common drive shaft and the pump shaft which can be selectably inserted by a coupling and which has a greater fixed transmission ratio than the first gear train. Upon insertion of the coupling the pump shaft is driven exclusively by the second gear train through the free-running drive and permits a uniform and continuous discharge of the filling mass in an arbitrarily long strand. The first-described method of operation is primarily applicable if the individual sausage portions are successively filled into a common sausage wrapping and, if necessary, separated from each other by twisting the wrapping between the individual portions. If a crank drive is used, the twisting step is effected during the idle stroke and therefore requires approximately the same time as the filling process. Essentially the same processes occur if portions are only parceled out, i.e if the separation of the individual portions is accomplished by other known separation means.

Mechanically-actuated apportioning pistons change the leverage-ratio of the oscillating drive for the matching thereof to differently sized portions for the filling machine of the aforedescribed type (see DT-PS No. 1,180,151). For a given number of revolutions per minute of the drive motor, the discharge velocity of the mass increases in proportion to the size of the portion to be discharged. It is therefore necessary to change the number of revolutions per minute whenever a relatively large weight adjustment is made, requiring in general a steplessly controlled drive.

Hydraulic filling machines (see DT-PS No. 1,083,094) are, however, also known where the discharge velocity is kept constant due to a uniform supply of hydraulic fluid and where large portions also require larger time intervals. This sytem can only be realized hydraulically. The total effort involved is, however, relatively large.

OBJECTS OF THE INVENTION

The invention takes as its starting point the filling machine of the first-described type and its object is to implement a machine in the simplest possible fashion so that the duration of a discharge phase automatically matches the weight of a portion even without any change of drive velocity and the interval between two apportioning phases is made largely independent of the size of the respective portion.

Another object of the present invention is to provide an improved method of and apparatus for stuffing plastically deformable sausage filling or the like into a sausage skin or the like.

SUMMARY OF THE INVENTION

This object is achieved according to this invention in a system wherein differential gear-train is provided having three parts, two of which are each always connected to the input side of a respective one of the two gear trains or to a common drive member, while the output sides of both gear trains are coupled to each other.

The differential gear-train acts as a branching-off gear-train provided with a drive. During the apportioning process the output sides of both gear trains are, for example, connected to each other at the pump shaft. The torque is then transferred via both gear trains to the pump drive, the second gear train acting as a subtractive gear-train reducing by its reaction on the differential gear-train the resultant drive velocity of the pump drive. The larger the displacement which is transmitted to the pump drive by the first gear-train, the larger the reaction displacement retransmitted from the pump drive to the differential gear-train. This reaction or subtraction causes in the first place a reduction of the transmission ratio for the first gear-train. Hence the pump drive is moved more slowly and the common drive member must cover a larger drive-displacement which, during the filling process, is proportional to the displacement occurring during the pump drive and hence to the size of the discharged portion. By means of relatively simple and entirely mechanical means a discharge velocity remaining approximately constant results which could otherwise only be obtained with complicated hydraulic arrangements. The larger the weight of the portion, the larger the discharge time, while the drive motor can run at an unchanged number of revolutions per minute. The accuracy of the apportioning process itself remains unchanged, since it is assured by the shape or adjustment of the first gear train.

Coupling of both gear trains in relation to the equalizing function in the differential gear train further causes motion to be only transmitted to the pump drive only if both gear trains are loaded. If the loading in one of the two gear trains falls, for example to a value set by frictional forces in the pump. i.e. particularly during the return stroke of the oscillatory drive, the free-running drive then moving practically without any transmission of force, then in the event of a stationary second gear train this free-running output part of the differential gear-train acting on the first gear-train only is moved. The drive takes place at an appropriately larger velocity corresponding to the changed transmission-ratio. This fast free-running motion is basically independent of the duration of the preceding apportioning process. In this short, practically unvarying time interval which can also be obtained if the apportioning weight is zero, known separation processes can therefore be accomplished, for example by cutting off an apportioned skin portion for filling the container, separating the sausage wrapping or the like. Such separation processes can also overlap in time and be executed by separately controlled drives. In lieu of a mechanical differential it is also possible to employ a hydraulic differential, which for example may consist of three pump-motor units.

In lieu of an oscillating drive with an adjustable displacement it is possible to utilize any other intermittently acting gear train, for example a geneva mechanism, or any other stepped gear train in which one, or several successive curved follower-rolls engage a cover or front-surface of a drive part by riding in a groove thereof. Regulating gear-trains of this nature maintain a positively-locking contact with the drive part even if the drive component vanishes. The free-running drive acting on the pump shaft or the post-coupled drive member of the pump can therefore be dispensed with. Since the displacement path is not variable in these or other transforming gear trains having cyclically or automatically changing transmission ratios, the weight of the portion can be set by a post-coupled, stepless gear train. Stepless gear trains can also be arranged within a common branch of, for example, the first and second gear trains.

The differential gear train is advantageously implemented as a planetary gear train with a sun wheel attached to a central drive shaft whereby the cross-piece or planet carrier of the planetary gear train is preferably coupled to the first gear train having an intermittently-actuated drive portion, and a second sun-wheel, or a drive-wheel rotatable and disposed concentrically with the axis of the gear train is coupled to a second gear train having a transmission ratio which remains constant. The whole transmission gearing from the drive motor can be accomplished without difficulty by such a differential gear train. It is also possible to use the second gear train directly as the filling drive, if the first gear train is stopped by arresting means.

A further transmission mode for the filling drive results if a third decouplable gear train is interposed between a drive member of the first gear train and a pump drive post-coupled thereto having a transmission ratio which drives the pump shaft with a different ratio than the second gear train. An additional transmission ratio, with or without subtraction, therefore results. A change-over coupling disposed on a drive shaft and effective between the third or differential gear trains and a part of the housing can undertake the guidance by relatively simple means. In the central position of that coupling apportionment is accomplished via engagement of the first gear train, in the stop-position via engagement of the second, and in the other remaining position of the coupling via engagement of the third and second gear trains for the filling drive.

According to another proposal the third gear train is coupled to the drive member of the first gear train by a free-running drive and is couplable thereto by a reversal of the sense of rotation. This reversal of the sense of rotation is in general accomplished via the drive motor whose poles may also be switchably reversable and which thus permits four filling velocities and two apportioning velocities. When the number of revolutions is doubled and the interval between apportioning processes is only half as large, but the apportioning process itself is dependent on the displacement exerted on the pump drive, the subtraction velocity becoming correspondingly larger as a result of the second gear train. A higher drive velocity will be selected for a soft filling mass and a lower velocity for raw sausage material.

A further switching possibility arises due to the fact that the second gear train is decouplable from the pump drive and is allowed to remain stationary. In addition to the two mechanical fill-drive modes a third mode can be arranged where only the third gear train is being driven, the second gear train remaining stationary.

Where filling machines have a turn-off device the drive of the turn-off device is preferably equipped with a second differential gear train according to the aforesaid embodiment having three coupling connections, one of those connections being always coupled via a fourth gear train to a common drive member, another via a fifth gear train to the first gear train, and the remaining one to the turn-off device. The power essential for the drive can be derived from the common drive member, the first gear train or its drive member then taking over the guidance function and transmitting only relativey small forces.

The fifth gear train is preferably coupled during the oscillatory drive of the pump in such a manner that the torque exerted on the first gear train is received through the one-way clutch of the pump drive. Therefore any reaction forces not derived from the turn-off device act on the first differential gear train and result in an adjustment of the displacement pump during the turn-off process.

As is further proposed, one of the two gear trains of the turn-off device may be a gear train with a cyclically variable transmission ratio. This may, for example, be a curved gear train, a stepped switching device, or a crank drive, but an elliptical gear train is preferred in view of its improved acceleration capability. Such a single gear train can therefore deform so that very small drive velocities result for a relatively long time during the discharge process but relatively large drive velocities are obtained for short periods of time during an apportioning interval.

The turn-off device is therefore assured to be driven in a preferably continuous manner so that a sinusoidal curve for example, is arbitrarily lifted by the subtractive action of one of the two gear trains for the smallest turn-off velocity to reach a value of approximately zero. It is easily possible to keep that smallest velocity exactly zero or to select it to be slightly positive or negative.

The apportioning and turn-off processes can overlap slightly in time. This is very advantageous since it is consequently possible to reduce the interval between two apportioning processes to a minimum and to nevertheless keep the turn-off velocity within bounds. It is also easily possible to displace the curve according to the load characteristics, in particular to delay it slightly in order to shift the start of the turn-off process more into the conveyance pause and to complete turning upon commencement of the apportioning process. This time delay is dependent on a number of factors, in particular the quality of the sausage wrapping and the filling mass and also on the amount of volume between the pump and the turn-off device. As a rule a firm preset adjustment of the fifth gear-train vis-a-vis the first will suffice. Such an adjustment can basically also be performed externally, for example by an additional small differential gear train or a second differential.

The cross-piece of the second planetary gear train is coupled to the fourth gear train and a sun wheel to the drive member of the first gear train via a fifth gear train. This arrangement primarily causes the main drive power to be supplied directly by the drive motor while the velocity guidance is accomplished by the first gear train.

BRIEF DESCRIPTION OF THE DRAWING

My invention will be better understood with reference to the accompanying drawing in which.

SPECIFIC DESCRIPTION

Figure 1:
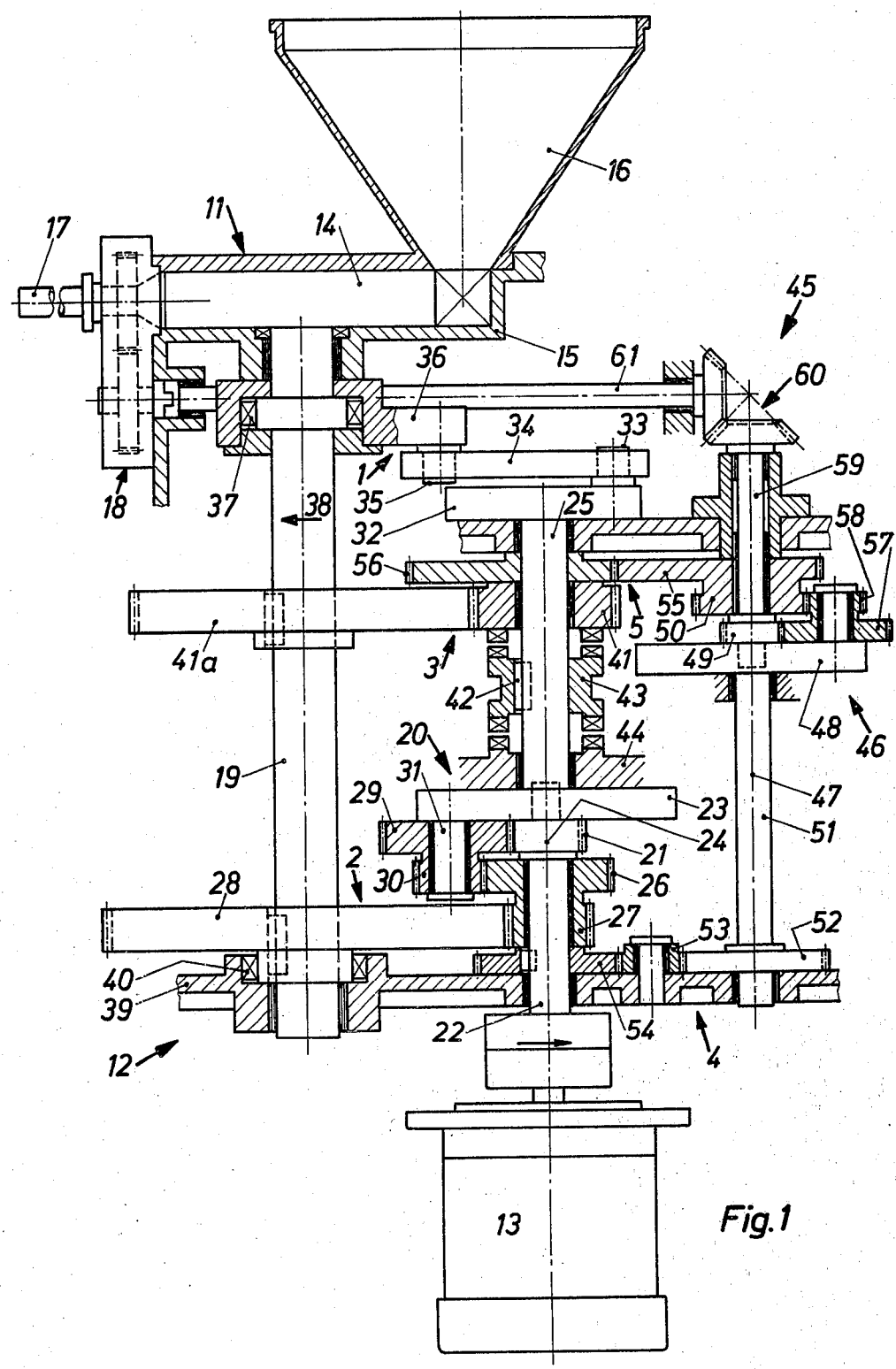
FIG. 1 shows a schematic representation of the gearing of a filling machine for sausage material with a turn-off device coupled thereto, in elevation.

The drawing shows a filling pump 11 driven by an electric motor 13 with reversible poles via a pump drive 12. Filling pump 11 is formed as a rotary-vane pump having vanes 14 guided eccentrically in a pump housing 15 so that a filling mass such as roasted sausage material is fed from a funnel 16 into a spout 17 driven by a turn-off arrangement 18 to be described later. A pump rotor firmly attached to a pump shaft 19 conveys an equal amount of a filling mass to the turn-off spout for an equal angle of rotation thereof.

Electric motor 13 is coupled to a first planetary geartrain 20 whose other coupling connections are coupled via gear trains 1 and 2 to a pump shaft 19. While a sun wheel 21 is firmly attached to a motor shaft 22, a planet carrier or cross-piece 23 is coupled via a cross-piece shaft 25 supported coaxially with respect to the motor shaft and its axis 24 to a gear-train 1. A second sunwheel 26 is disposed rotatably on the motor shaft and firmly connected to a gear wheel 27 of gear train 2, whose other gear wheel 28 is keyed to pump shaft 19. Planetary wheels 29 and 30 of a planetary wheel-pulley supported on a pin 31 of cross piece 23 engage with respective sun wheels 21 and 26. A crank disk 32 is firmly attached to the upper end of cross-piece shaft 25, the crank disk having a crankpin 33 coupled to a crankpin 35 of a crank 36 via a driving rod 34. Crankpin 33 can be radially adjustable vis-a-vis gear axis 24 on crank disk 32 in a known manner or by any other means, as shown for example, in German Pat. No. 1,180,151, or can be used for adjusting the position of crank 36. Crank 36 moves in any case to and fro in an oscillatory manner of constant magnitude upon rotation of cross-piece shaft 25. Pump shaft 19 is connected to crank 36 via a free wheel drive or unidirectional clutch 37, which permits the rotary entraining of pump shaft 19 in the direction of arrow 38, but decouples them when moving in an opposite rotational direction. To prevent a reverse rotation of the pump rotor, pump shaft 19 is secured to a gear housing 39 via a one-way coupling 40.

Motor shaft 22, both sun wheels 21 and 26 and planet carrier 23 rotate clockwise during operation of the machine as viewed from the bottom of FIG. 1. If both gear trains 1 and 2 are to drive pump shaft 19 in the same sense, then the crank drive consisting of members 32 to 36 must secure a reversal of that sense of rotation during a stroke. Since respective torques are equalized via the differential action of the planetary gearing, the power being therefore divided according to the given transmission ratio, the crank drive cannot become overloaded. The larger the displacement angle transmitted by the crank drive to pump shaft 19, the larger the restoring movement which is transmitted to the planetary gear-drive via gear drive 2 acting here as a subtractive gear-drive. The resulting transmission ratio between motor shaft 22 and shaft 25 is therefore tailored to the magnitude of the angle of oscillation of crank 36. The larger this angle of oscillation, the larger the magnitude of subtraction exerted by gear wheel 28 on the planetary drive. The drive motion executed by motor shaft 22 is fairly nearly proportional during the apportioning process to the magnitude of the portion to be discharged. The duration of the discharge process is directly proportional, however, to the magnitude of the portion set, for example, by the crank drive, while the power of motor 13 remains approximately constant during the discharge process independent of the magnitude of the portion set. No additional transmission of force by any precoupled stepless gear-drive or the like is therefore necessary, the magnitude of the portion need merely be altered, resulting in a automatic change of the output velocity without there occuring any overloading as a result of changed torques being exerted due to the changed magnitude of the portion. Furthermore the entire gear transmission can be accomplished by the planetary gear drive.

The equalization of torques achieved in the planetary gear does not, furthermore, exert any appreciable torque on gear train 2 during the idle stroke of the crank drive or during the return movement of crank 36 when free wheel drive 37 has decoupled the crank 36 from pump shaft 19. Pump shaft 19 then remains stationary and cross-piece 23 then returns with an appropriately increased velocity, since no subtraction occurs. The duration of such a return movement is thus independent of the respective magnitude of the portion set, is exclusively determined by the number of revolutions of motor shaft 22 and the selected transmission ratio, and is therefore frequently shorter than the apportioning or discharge process. Alternately short and equally long apportioning intervals therefore follow apportioning processes, the lengths or durations of which are determined by the respective portions set, being almost exactly proportional thereto.

Figure 3:
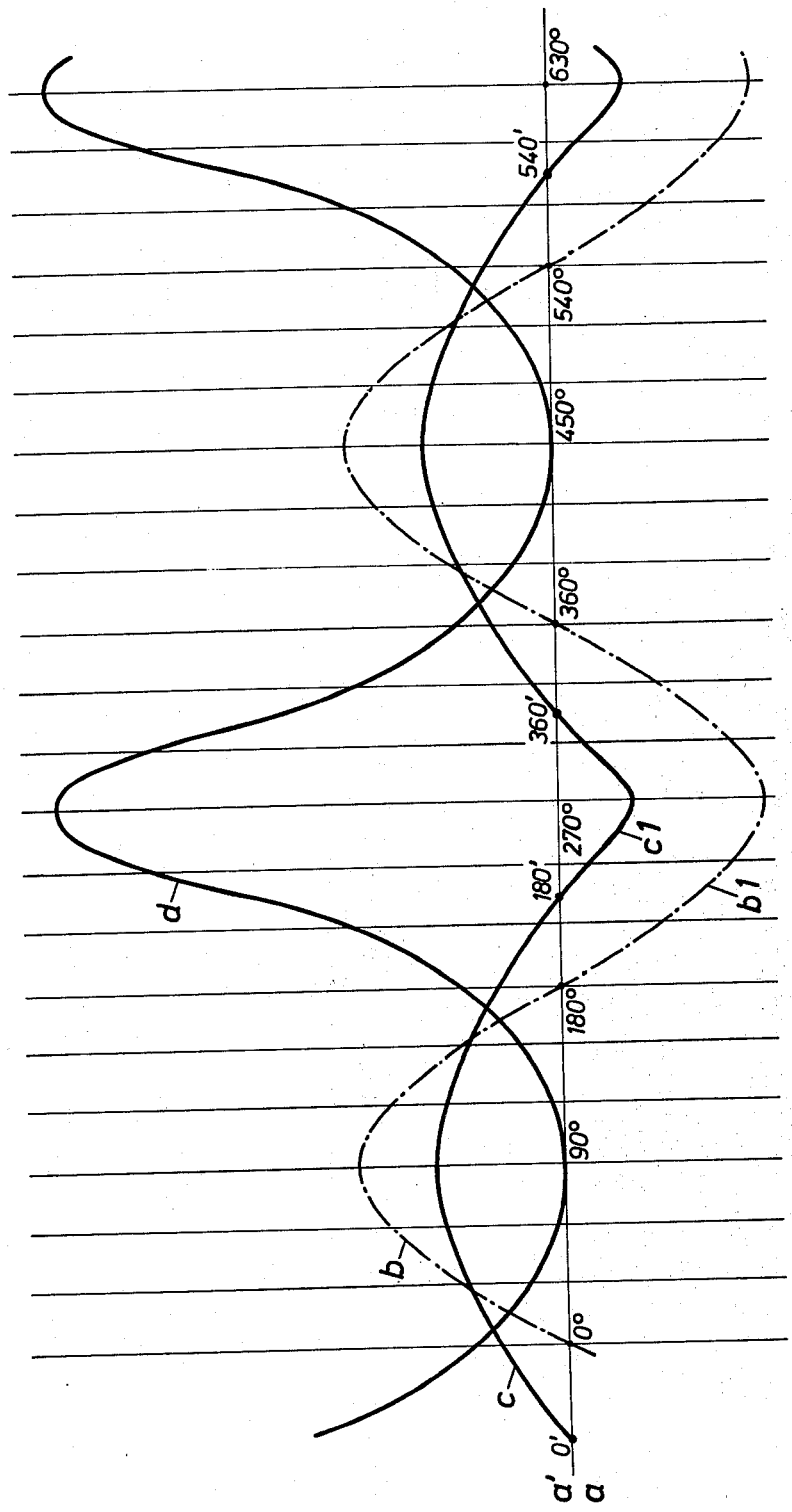
FIG. 3 shows a corresponding velocity diagram.

This is best ascertained from FIG. 3. The rotation angle $a$ for crank disk 32 is shown below the horizontal abscissa. If the pump drive is received exclusively by a crank disk rotating at a uniform velocity, a fairly exact sinusoidal velocity diagram $b$ will result for crank 36. If the transmission ratio between the motor and crank disk 32 is not, however, taken into account, then the sinusoidal curve can also be plotted as a function of the angle of rotation of the motor, i.e. one deals with a pure time diagram, the positive motion-component of pump shaft 19 being transmitted by the free wheel drive, while the negative motion component according to the lower portion of the curve $b$ will not be transmitted.

If one plots, however the velocity components effectively appearing on crank 35 as a result of the drive arrangement of FIG. 1 versus time or versus a corresponding angle of rotation of motor 13, then curve $c$ will result. For clarity's sake the corresponding angles covered by crank disk 32 are shown above the abscissa by a scale $a'$.

Although equal angles from 0° to 180° or from 180° to 360° are covered by the apportioning or displacement and idling strokes of the crank disk respectively, the displacement stroke corresponding to the positive portion of curve $c$ extends over a much longer period of time than the negative portion $c1$ of the curve. The duration of that negative part of the curve remains constant even with different apportioning magnitudes. It is obtained from the selected transmission ratio of subtraction. The length of the positive portion of the curve as a function of time would, however, vary as a function of the apportioning magnitude. If one assumes, for example, that 36 revolutions of shaft 22 are necessary for motor shaft 22 to rotate crank disk 34 according to curve $c$ in FIG. 3 by 360°, then only approximately 9 rotations are required for the idling stroke according to curve $c1$, but for the apportioning stroke according to c 27 revolutions would have to be undertaken, and for a doubled or halved portion 54 and 13.5 revolutions would have to be performed respectively. Due to the unchanged number of 9 revolutions needed for the idling stroke the motor would hence have to perform 63 and 22.5 revolutions for doubled or halved portions respectively instead of 36 revolutions for one cycle.

According to FIG. 1 there is arranged parallel to gear train 1 another gear train 3 formed by a gear wheel 41 disposed rotatably on shaft 25 and a gear wheel 41a keyed onto pump shaft 19. A coupling sleeve 42 guided by a key 42' on cross-piece shaft 43 can be coupled from the center position shown to either a part 44 of the housing or to gear wheel 41. Upon coupling to the housing cross-piece shaft 25 is arrested and the drive motion for continuous actuation of the pump or a first filling-velocity is transmitted by gear train 2 via planetary wheels 29 and 30 acting as intermediate gears. Upon coupling to gear wheel 41 transmission is effected with a different transmission ratio via both gear trains 2 and 3.

On the right side of FIG. 1 there is illustrated a twist off gear assembly 45 with a second planetary gear assembly 46, which has two sunwheels 49 and 50 and a planet carrier or a cross-piece 48 disposed coaxially on a gear axis 47 for driving shut-off device 18. Planet carrier shaft 51 is coupled directly to motor shaft 22 via a fourth gear train 4 formed by three gear wheels 52, 53 and 54. Sun wheel 50 is connected to an elliptical gear wheel 55, which together with an elliptical gear wheel 56 attached to cross-piece shaft 25 forms a fifth gear train 5. Both sunwheels engage respective planetary gear wheels 57 and 58 joined to each other, sun wheel 49 being connected via its shaft 59, a bevel gear-train 60 and a shaft 61 with shut-off arrangement 18.

The drive therefore takes place at two location, i.e. via planet carrier 48 and via sun wheel 50, but shut-off movement takes place via the single sun wheel 49. The two drive-members are therefore connected to each other by their respective gear trains 4 and 5 and the interposed first planetary gearing 20. In this way the drive power can be furnished substantially directly by motor shaft 22, but guidance is accomplished primarily via the planet-carrier shaft 25 of the first planetary gear train and the differential gear train of gear train 5. Also elliptical gear wheel 56 is attached to the shaft 25 in such a manner that it causes as small as possible a rotation of sun wheel 50 during an operating stroke, and planetary gear-train 46 is layed out so as practically not to cause any twist-off movement of sun wheel 49, the number of output revolutions therefore reaching a value of zero. The elliptical gear train has, however, reached its greatest transmission ratio during a conveying pause, sun wheel 49 thereby being temporarily brought to a high number of revolutions per minute and thus executing the twist-off movement.

This is again best ascertained from curve d in FIG. 3 which reproduces the shut-off velocity as illustrated by the number of revolutions of sun wheel 49 or gear trains postcoupled thereto, or even of spout 17. This shut-off velocity is plotted here in dependence of the angles covered by cross-piece shaft 25 or the driving member of gear train 1, scale a' thus covering angles of 0° to 540°. It will be understood that curve d can be deformed arbitrarily in a horizontal or vertical direction by a change of transmission ratios of planetary gear drive 46 and elliptical gear drives 55 and 56, i.e. it is possible to compress the large velocities even more strongly within a smaller time-interval or a smaller angle of rotation of crosspiece shaft 25 and thereby flatten the region of the lower velocities even further. By a lifting and or lowering of the curve the minimal angular velocity can be set either below or above 0. The curve can be finally displaced arbitrarily also by a change of the rotating position of elliptical gear wheel 56 vis-a-vis cross-piece shaft 25 in a horizontal position. This may be necessary for delaying the shut-off movement acting on the end of spout 17 in time vis-a-vis the apportioning pause appearing directly on pump 11. This way the pump drive and the drive for the shut-off arrangement are optimally tailored to each other by extraordinarily simple, and as a rule, fully mechanical means. The shape of the curve must naturally be tailored to the individual demands of the plant, and can, if necessary, be corrected by an exchange of individual gear-wheel pairs. Thus elliptical gear wheel 56 need not be keyed to carrier 25, but can be adjustably attached in any known manner thereto.

Thus the system as illustrated in FIGS. 1 and 3 operates as follows:

The motor 13 is electrically energized at all times the machine is operating so that sun gear 21 and planet carrier 48 also both turn continuously in the same rotational sense. Normally the clutch sleeve 43 is positioned in the central position illustrated in FIG. 1 so that the shaft 25 is not directly coupled to the gear 41 or the housing 44.

This rotation of the sun gear 21 is transmitted to the unitary planet gears 29 and 30 and then through the gear wheel 28 to the shaft 19 that acts as the input element for the pump 11. Similarly the rotation of the shaft 21 tends to rotate the planet carrier 23 and its shaft 25. During that part of the rotation or stroke of the crank mechanism 32-36 that converts the rotation of the shaft 25 into reciprocation of the crank 36 in which the clutch 37 locks this crank 36 to the shaft 19 and the pump 11 is operating to extrude a measured mass of sausage filling, rotation of the carrier 23 is resisted so that, in effect, the amount of rotation imparted to the shaft 19 proportional to the stroke length and the resistance offered by the sausage filling, which latter characteristic is determined by the viscosity of this filling.

Once the portion of sausage filling has been extruded from the spout 17 into a sausage skin carried thereover, which instant corresponds to the end of the reciprocation stroke of the crank link 34, the unidirectional clutch 37 decouples the crank 36 from the shaft 19 and therefore allows the shaft 25 to turn freely. This releasing of a resisting force on the shaft 25 allows the planet carrier 23 to spin rapidly about the drive axis 24 so that the sun gears 29 and 30 will not transmit rotary force to the gear wheel 38 and the shaft 19 will simply stop rotating. Thus the pump 11 stops completely as the crank disk 32 returns to the start of its next pumping cycle, after rotating through at least 180°.

During this rapid return stroke the eliptical gears 55 and 56 are effective on the planetary gear 57 to rotate the sun gear of the three-part assembly 46 at high speed so as to rotate the twist-off device 18 and form a twisted-off neck between two adjoining sausage links.

By the time the shaft 25 has returned to a position that is the start of another pumping stroke of the link 34 the sausage link is twisted off and another operating cycle may begin.

If the sleeve 43 is dropped down onto the housing 44 the pump 11 will be operated at a speed directly proportional to the rotation speed of the motor shaft 22. Since the speed of this latter element is constant, the pump 11 will run at a constant rate. Such an operational mode is useful in cleaning the device and when simply extruding a continuous strand of sausage.

Moving the sleeve 43 up to engage the teeth of the gear 41 merely changes the operating speed of the sausage stuffer, but does not otherwise effect the type of cycling as described above.

Figure 2:
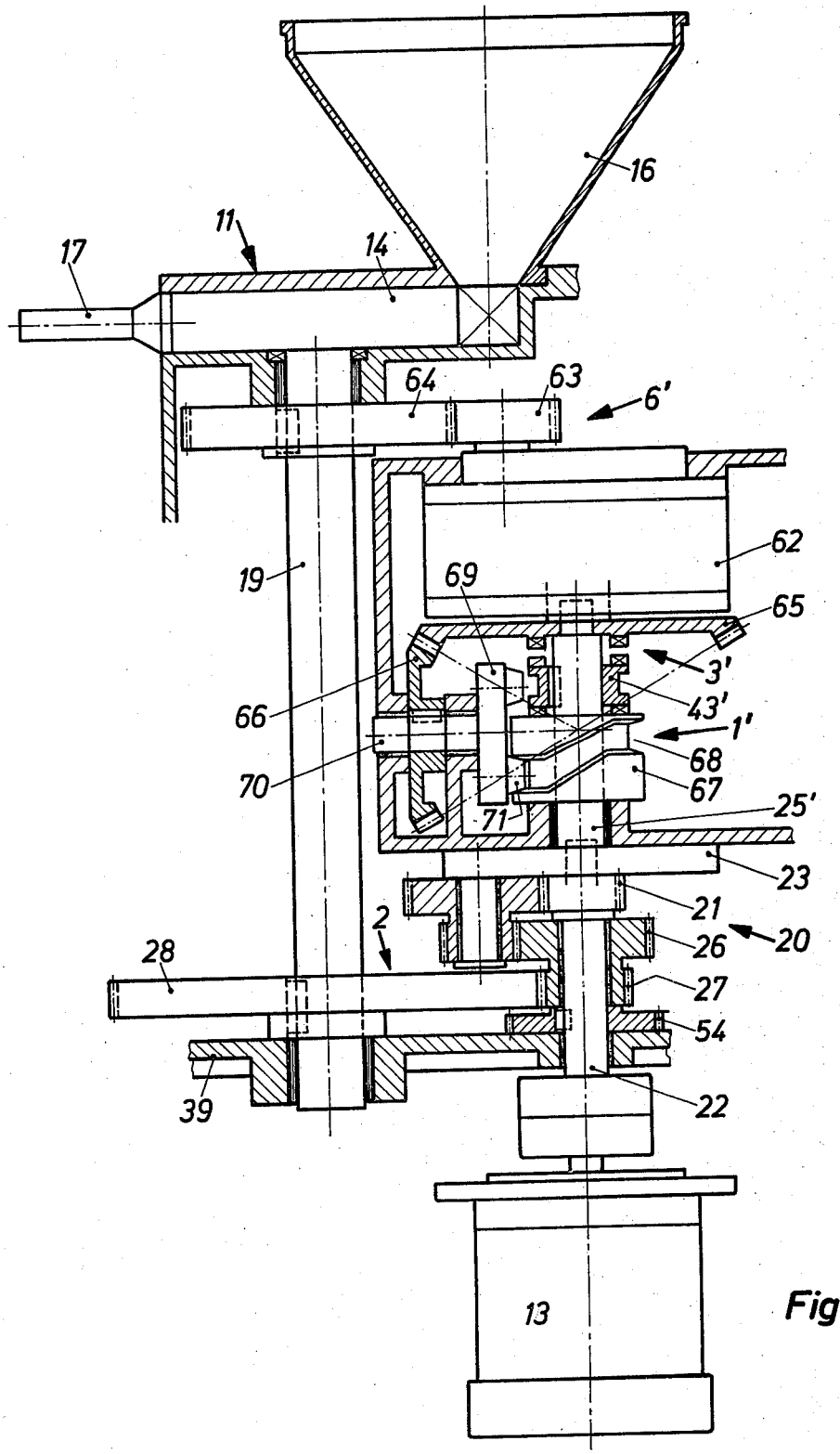
FIG. 2 shows an alternate version of the pump drive of FIG. 1 in elevation.

A variation of the pump drive of FIG. 1 is shown in FIG. 2, where the same structural parts have been given the same numerals. Thus planetary gear drive 20 has been kept there unchanged. From crosspiece shaft 25', however, two gear trains 1' and 3' branch out via a change-over clutch 43' and are again reunited in a following gear train 6' which includes a steplessly variable transmission 62 and two gear wheels 63 and 64. While gear train 3' is practically limited to a direct coupling connection between crosspiece shaft 25' and bevel gear 65, gear drive 1' comprises in addition to a bevel gear 66 meshing with axle-drive bevel wheel 65 a conventional step-wheel gear train. Here a bushing 67 is rotatably supported on crosspiece shaft 25' and can be coupled thereto by change-over clutch 43'. Bushing 67 is formed with a peripheral groove 68 which is helically- or similarly shaped according to the desired switching process and also extends in certain regions within a radial plane. A switching disk 69, on whose shaft 70 is keyed the bevel gear 66 is driven by bushing 67. This switching disk carries several peripherally equispaced follower-rolls 71, which successively engage with the peripherally recessed portion 68 of bushing 67 and thereby turn switching disk 69 with gear train 6' coupled thereto by an angle corresponding to the distance between two follower-rolls 71. With drives of this type it is also possible to stop a coupled gear train connected thereto in a certain angular position. Free wheel-drive coupling 37 and one-way clutch 40 of FIG. 1 can therefore be dispensed with. For the setting of the apportioning weight a separate change in the transmission ratio must, however, be made, which is made possible here by the continuously variable stepless gear-drive 62.

In lieu of the switched gear train shown here other gears having a switched disk with a curve or similarly-shaped front surface switching-type helices or worm-gears or other known stepped-switching arrangements, such as geneva mechanisms can be provided. In a planetary gear-train an inner sun-wheel can be replaced with an externally located ring-gear, whereby a single planetary gear will in most cases suffice. In lieu of planetary gear trains other differentials, particularly hydraulic differentials can be used. The latter are particularly suitable if, as a result of spatial limitations, the parts to be connected cannot be placed immediately next to each other. Even in a purely mechanical implementation one can then make do with relatively small-dimensioned individual building-parts. Considering the multitude of effects obtained, the technical effort is exceedingly small.

I claim:
1. A machine for filling a tube such as a sausage casing with a mass of plastically deformable material such as a sausage filling mass, comprising:
   a motor having a drive shaft;
   a three-part differential gear assembly having a first gear part, a second gear part and a third gear part, said gear parts intermeshing for mutual differential rotation of said first and second parts, said third part of said differential gear assembly being connected to said shaft for driving of said third part and said assembly whereby an increase in speed of said first part results in a reduction of speed of said second part and vice versa;
   a pump having an element rotatable for ejecting said mass of plastically deformable material into said tube with a volume proportional to the angular displacement of said element in a predetermined sense, said element being intermittently displaceable to control the rate of displacement of said mass;
   an intermittent-drive arrangement connected to said element and rotatable to intermittently displace said element;
   a first gear train connecting said first part of said differential gear assembly with said intermittent drive for rotating same upon rotation of said first part of said differential gear assembly; and
   a second gear train connecting said second part of said differential gear assembly with said element for rotating same upon rotation of said second part of said differential gear assembly.

2. The machine defined in claim 1 wherein said differential gear assembly comprises a first sun wheel constituting said second part and freely rotatable relative to said shaft, a planet carrier constituting said first part and having a planet gear meshing with said first sun wheel, and a second sun wheel fixed to said shaft and in mesh with said planet gear, said second sun wheel constituting said third part of said differential gear assembly.

3. The machine defined in claim 1 wherein the first of said gear trains is provided with means for changing the intermesh ratio thereof.

4. The machine defined in claim 3, further comprising arresting means for stopping said first gear train.

5. The machine defined in claim 3, further comprising a third gear train selectively connectable to said assembly for operation of said element.

6. The machine defined in claim 1, further comprising turn-off means for twisting and separating portions of sausage emerging from said pump means, and another differential gear assembly interposed between one of said gear trains, said drive shaft and said turn-off means for operating same.

7. The machine defined in claim 1 wherein said intermittent-drive arrangement is a crank and a free-running clutch connecting said crank with said element.

* * * * *